United States Patent [19]

Karnaugh

[11] 3,764,914

[45] Oct. 9, 1973

[54] HIGH SPEED LINE EQUALIZER

[75] Inventor: Maurice Karnaugh, Mount Kisco, N.Y.

[73] Assignee: International Business Machines Corporation, Armonk, N.Y.

[22] Filed: Dec. 27, 1971

[21] Appl. No.: 212,546

[52] U.S. Cl. ...................... 325/42, 325/323, 333/18, 333/70 T

[51] Int. Cl. ........................ H04b 1/00, H03k 5/159

[58] Field of Search ...................... 325/42, 323, 472; 333/18, 70 T

[56] References Cited

UNITED STATES PATENTS 3,648,171 3/1972 Hirsch .................................. 325/42

*Primary Examiner*—Felix D. Gruber
*Assistant Examiner*—R. Stephen Dildine, Jr.
*Attorney*—Roy R. Schlemmer, Jr. et al.

[57] ABSTRACT

An extremely fast equalizer is disclosed which utilizes only channel response data to control the equalizer settings. The equalizer is adapted for operation in either the automatic or adaptive mode. A basic equalization module is developed which can be used either singly or in tandem wherein subsequent modules successively improve the equalization. The circuit differs markedly from prior art equalization circuits in that only line response data rather than equalizer outputs are utilized in determining equalizer tap settings. In one preferred embodiment, the equalizer design is based on an expansion in powers of $F = P/(1-T)$ which converges rapidly and wherein $P$ represents precursor intersymbol interference terms, and $T$ represents tail intersymbol interference terms. This expansion results in an iterative equalizer configuration.

11 Claims, 11 Drawing Figures

HIGH SPEED LINE EQUALIZER

BACKGROUND OF THE INVENTION

In data handling systems in general and in data transmission systems in particular, data must often be received and utilized which has been subject to distortion due to the charactertistics of the channel to which it was previously subjected. In the case of transmission lines the distortion is due to characteristics of the transmitting medium as well as modulators, demodulators, filters, etc., which change the waveform and introduce what is known as intersymbol interference by spreading the time durations of the data pulses so that one pulse may overlap many neighboring pulses. In the case of binary data sequences it is possible that in a worst case, a plurality of undesired signals can either add to or subtract from a given data pulse thus causing possible erroneous detection of the data pulse, in the presence of noise, in the receiving or utilizing station. These undesired signals will precede and follow a given data pulse and are known in the art as intersymbol interference terms. The ones preceding the main pulse being known as precursor terms and the ones succeeding or following the main pulse known as tail interference terms. Their effect is to reduce the noise margin for error in detection.

It is the object of any equalization system to reduce these various intersymbol interference terms. To minimize undesired intersymbol interference due to distortion from the transmitting line, filters having compensating characteristics called "Equalizers" have long been used in the art. Time-domain filters have been found to be particularly suitable for use in digital data transmission systems. Such time-domain or multi-tap equalizer filters, as they are known in the art, consist of a number of delay sections in series, each section having the same delay, and usually a tap point at the beginning and end of each delay section. Usually, the delays are equal to the time between successive pulses. Such filters may be either the non-recursive (i.e., transversal) type or the recursive type. Since channel characteristics are usually not known beforehand and may be subject to time variations, it is necessary to be able to tune the equalizer to any desired channel. This means that a system must be devised to obtain weights for the tap gains such that the total distortion is reduced to a minimum when all of the tap outputs are summed together to provide a unitary output. A common problem to be solved for all such multi-tap filter type equalizers is the development of algorithms and thus, control circuitry for adjusting the various tap settings to produce the desired equalization.

One of the more common types of equalizer controls involves what is generally referred to as the iterative correction of the tap weights. By iterative, as the term implies, successive adjustments are made based on additional information such that ultimately an optimal adjustment of the various tap gains is made to produce the best equalization possible for the particular system. Within the area of iteratively adjusted equalizers there are two main subdivisions. The first is the automatic, wherein a sequence of training pulses is first transmitted and the adjustment of the filter is essentially made before actual data transmission is attempted. Thus, as each new training pulse is received additional adjustments are made to the taps as required by the logic circuitry. The second type of iterative equalizer is the adaptive type, wherein adjustments are made concurrently with the transmission of data. Automatic and adaptive systems known in the art give very good equalization relative to the number of filter taps employed; however, they suffer in that they are very slow, i.e., many data pulses are required before satisfactory equalization is obtained.

Another type of equalizer exemplified by copending application Ser. No. 158,416 filed June 30, 1971, of G. K. McAuliffe entitled "Fast Convergent Automatic Adaptive Equalizor Using Re-circulation." As the name implies, it operates automatically or adaptively. The significance of this system is that the convergence is much faster than with those outlined above, but additional computational circuitry is required. Therefore, there is an obvious trade-off between cost and speed; however, the equalization is quite good.

Generally speaking, the prior art equalization systems as with most things suffer from a cost performance trade-off. In this case, the particular performance being referred to is primarily time wherein the faster the convergence or optimized equalization, the greater the cost of the equalizing circuitry. There are certain applications where both high-speed and low cost are quite important and the equalization need not necessarily be optimal. An example of such a requirement is in a multipoint terminal system attached to a central computer wherein the system requirements are such that neither a great deal of time nor money can be spent at the terminal for purposes of equalization. The current state of the equalizer art is such that no really commercially practical automatic or adaptive time-domain equalizers exist for such applications.

SUMMARY AND OBJECTS OF THE INVENTION

It has now been found that a relatively low cost high-speed equalizer may be produced having satisfactory equalization characteristics for many applications. The equalizer of the present invention utilizes only the channel response characteristics, which are determined from the pulses received from the channel, to determine the equalizer tap settings. This is contrasted with prior art systems which equalize based on the actual equalizer output rather than the received pulses.

The present system utilizes a unique equalizing algorithm, which particularly lends itself to the modularizing of the equalizer wherein a basic module providing a certain amount of equalization is produced and, in order to improve the equalization quality, identical modules may be simply added in tandem.

According to a further aspect of the invention, the equalization of both precursor and tail intersymbol interference terms in each module is accomplished using a single delay line having one set of taps for precursor equalization and another set of taps connected to the same points of the delay line for tail equalization. Also a minimum amount of circuitry is required to accomplish the equalization especially in the number of the storage registers wherein the respective gain settings for the variable gain controls on the respective taps are stored.

It should be understood that the present equalization algorithm does not produce an optimal quality of equalization; but for the specific high-speed, low cost application such as in a terminal located in a multipoint system the design is believed to be quite satisfactory.

It is accordingly a primary object of the present invention to provide an automatic or adaptive equalizer circuit for electrical signals which has very fast convergence at low cost.

Another object is to provide such an automatic equalizer particularly adapted for use in multipoint terminal systems.

It is a still further object of the invention to provide a basis equalizing module which can be simply connected in tandem with other substantially identical modules for improved equalization.

It is yet another object of the invention to provide such an equalizer which utilizes only sampled channel response characteristics to obtain tap setting values.

The foregoing and other objects, features and advantages of the invention will be apparent from the following more particular description of preferred embodiments of the invention, as illustrated in the accompanying drawings.

DESCRIPTION OF THE DISCLOSED EMBODIMENTS

Figure 1A:
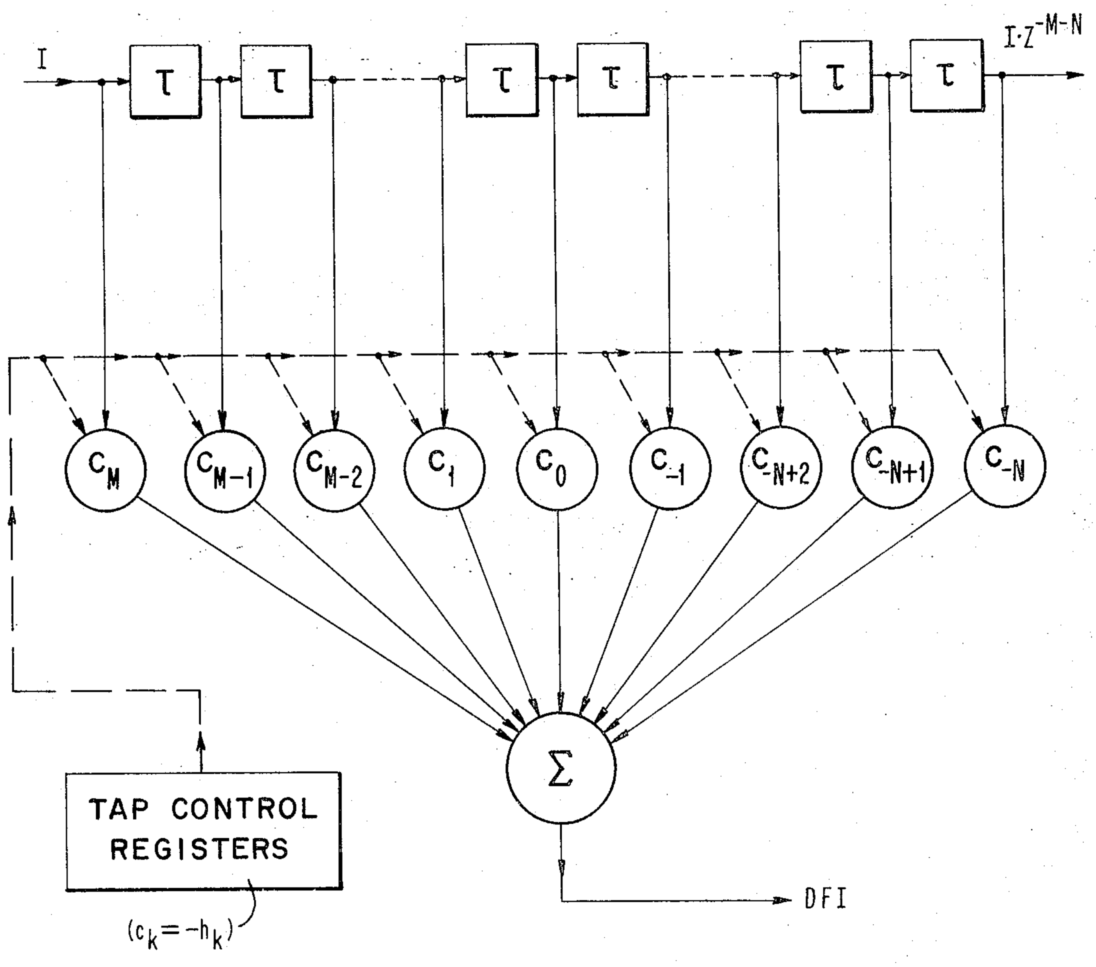
FIG. 1A comprises a schematic representation of a time domain transversal filter labeled to realize a response DF.

The objects of the present invention are accomplished in general by a method for equalizing a distorted signal received from a channel having the general form $H=1-F$. The method includes, first, estimating the channel response for all intersymbol interference terms directly from the signals received from the channel. The value corresponding to each term is separately stored in a register. These values are subsequently utilized to set corresponding taps of at least one time domain filter, and subsequent received data signals sequences are passed through at least one equalizing module including such a controlled time domain filter. It is shown that a filter whose Z-transform response equals that of a truncated series expansion of $1/H$ can be formed by connecting one or more duplicates of said equalizing module in series. By ignoring the remainder term of the series expansion and by providing equalizing modules for only as many of the terms of the expansion as are considered significant, the total hardware required to provide satisfactory equalization for many applications is kept at a minimum.

Further, by controlling the form of the expansion so that the individual terms thereof are subsequently identical in terms of the transfer characteristics required, each module of the resulting equalizing filter is substantially identical wherein one module is placed in tandem with a preceding module to produce a total equalizing effect on received signal sequences.

According to one disclosed embodiment of the invention, the modules are exactly identical. In a second embodiment all of the modules but one are identical and the non-identical module is actually a simplification of the others. In a still further suggested, but not specifically disclosed embodiment, the expansion of the polynominal takes on a factored form and the modules differ only in that one of the tap settings for each module has a predetermined but unique value whereas in the other embodiments all of the tap settings are the same. In the illustrated embodiments, the taps to the time domain equalizer filters in each module are all provided with the same tap settings from a single control register. Further, these tap settings are acquired directly from the line response by means of a simple averaging and normalizing operation and, in the automatic mode, require no correlation. In the disclosed embodiment of the invention allowing operation in the adaptive mode, the correlation function required compared to that of current prior art filters is reduced and only as many correlators are required as there are taps in any one of the modules containing a time domain filter.

In the filters utilized in each of the disclosed modules, there are only as many taps as there are significant intersymbol interference terms, both precursor and tail. This is contrasted with more conventional filters such as the well known Lucky filter wherein there are two to three times as many taps as there are significant interference terms in the received channel signals. Thus, the storage registers for storing the tap weights of the present system will be one-half to one-third the size of those of more conventional systems. Further, in the automatic mode embodiment only averaging of the as-received interference terms is utilized in determining tap weights. Even in the adaptive mode embodiment of the present invention the correlation is consideraly reduced and only as many correlators are required as there are significant interference terms in the channel response which is again one-half to one-third as many as in more conventional systems.

It will thus be seen that the equalization method and apparatus of the present invention allow for the production of a far simpler and less expensive equalizer that those heretofore used. Further, the modularization or iteration of the basic circuit design further reduces the design and cost of the filters. It should be clearly understood, however, as will be set forth more fully subsequently, that the degree or accuracy of equalization is less for a given total number of taps with the present system than is possible with some of the more complex equalizers of the prior art. However, it has been found that the equalization obtainable by the present system is quite adequate for the aforementioned multipoint terminal systems wherein both speed and low cost are important factors.

Before proceeding with a specific description of the operation of the disclosed embodiments, a description of the mathematics involved in arriving at the various filter designs will be clearly set forth. Specifically, four separate equalizer response formulas in terms of polynominal expansions are developed. From these the design of the specific equalizer modules will be apparent.

In the following description of the derivation of the present invention, the two-sided $z$-transform notation will be used, in which $z^k$ is the transform of an impulse at time $-k\tau$, and multiplication by $z^{-1}$ represents a delay of $\tau$ seconds. The interval between data samples is assumed to be $\tau$ seconds.

The channel impulse response H is denoted by:

$$H = 1 - F = 1 - T - P \tag{1}$$

In this formula the 1 denotes the main or desired pulse, the $-F$ denotes the overall interference term, and the $-T$ and $-P$ denote the tail and precursor interference terms which make up the total interference $-F$. The tail interference term is denoted by:

$$-T = \sum_{k=1}^{N} h_{-k} z^{-k}. \tag{2}$$

The right-hand side of the above formula, states that any pulse that is delayed $k$ units from the main pulse has an amplitude $h_{-k}$. As stated above, this formula is the "tail" of the total interference, $-F$. The following formula denotes the "precursor" intersymbol interference terms:

$$-P = \sum_{k=1}^{M} h_k z^k. \tag{3}$$

The above formula represents the precursor terms which, as will be well understood, represents the interference preceding the desired term. The total interference for the channel is:

$$-F = -T - P.$$

In the above formula the negative signs have been chosen for convenience.

Assuming a channel having response H, a desired equalizer for this channel would ideally have a response G such that:

$$HG = B, \text{ or } G = 1/H.$$

In the above formulas the 1 again denotes only the main, or desired signal pulse; i.e., where the equalizer response and the channel response cause all the interfering terms to be canceled. However, some excess delay will be necessary in order to equalize precursor terms; and the inversion of H will only be approximated in practical cases. Therefore, what one must hope for in designing an equalizer filter is better expressed by:

$$G \approx D/H.$$

In the above formula, D represents the necessary delay.

Observe now that:

$$1/H = 1/(1-F) = 1 + F + F^2 + \ldots + F^n + F^{n+1}/(1-F)$$

The above formula is an algebraic identity. It will be noted that the last or right-most term is a remainder and if this is sufficiently small, which is assumed in the present case, the equalizer response G may be approximated by:

$$G_n \approx 1 + F + F^2 + \ldots + F^n.$$

Technically, this is not a realizable form because F contains some precursor terms, P, which anticipates its input by M sample periods. However, it is possible to realize $z^{-M}F$ since no harm is done if the output is delayed by a given number of units which allows one to realize the following relationship:

$$G_n = D^n (1 + F + F^2 + \ldots + F^n) = D^n + D^{n-1}(DF) + D^{n-2}(DF)^2 + \ldots + (DF)^n \tag{4}$$

In the above formula $D = z^{-M}$.

From the above formulas, the error in equalization may be expressed as follows:

$$E(G_n) = HG_n - D^n = -D^n F^{n+1} \tag{5}$$

What will now be shown in an analysis of the possible error effects of various possible forms of a filter. As will be apparent subsequently, this allows the design of a somewhat more efficient system in terms of equalization error by choosing the iterated terms in the polynomial expansion of the filter response to somewhat optimize the design approximation. Continuing the above analysis, the worst possible interference with any pulse in a given binary sequence $$A = \sum_{k=-\infty}^{\infty} a_k z^k,\ a_k = \pm 1 \tag{6}$$

occurs when the data values cause all interfering signals or terms to have signs opposite to that of the pulse being detected after transmission through the channel, H. In this case the magnitude of the interference is:

$$||F|| = ||T|| + ||P|| = \sum_{k=1}^{N} |h_{-k}| + \sum_{k=1}^{M} |h_k| \tag{7}$$

In the above formula the notation for $||F||$, $||T||$ and $||P||$ refer to the "norm" of the distortion and the quantities $|h_{-k}|$ and $|h_k|$ refer to absolute values. After equalization by $G_n$, the distortion may be expressed by:

$$||E(G_n)|| = ||D^n F^{n+1}|| = ||F^{n+1}|| \leq ||F||^{n+1} \tag{8}$$

Since D is a pure delay it disappears. The inequality in the formula above becomes an equality whenever all terms in the expansion of F have the same sign. In the formula, n refers to the highest power of DF in $G_n$, Equation 4. Actually, the coefficient of $z^0$ in the expansion of $-F^{n+1}$ should be considered separately, because it modifiies the amplitude of the desired pulse. However, the above formula still represents the worst case which occurs when all terms in the interference, −F are negative. In this case all terms in $-F^{n+1}$ have negative signs. The above statement may be proved mathematically but is not specifically shown here as it is not considered germain to the actual invention.

From Equation 8 above we see that $||E(G_n)|| \rightarrow 0$ as $n$ becomes large whenever $||F|| < 1$. This is a sufficient condition that the channel be equalizable but it is not a necessary condition.

In order to avoid dealing with numerous special cases, it will be assumed that $||F||<1$. Therefore, $||E(G_n)||$ can be made small enough by a suitable choice of $n$. This will be shown subsequently. A different approximation to 1/H will now be derived and compared with $G_n$.

$$1/H = 1/(1-F) = 1/(1-T-P) = 1/(1-T) \cdot [1/1-P/(1-T)]$$

$$= \frac{1}{1-T}\left(1+\frac{P}{1-T}+\left[\frac{P}{1-T}\right]^2+\ldots+\left[\frac{P}{1-T}\right]^n+\frac{\left[\frac{P}{1-T}\right]^{n+1}}{1-\frac{P}{1-T}}\right)$$

A realizable approximation of this is:

$$\hat{G}_n = D^n/(1-T)\ (1 + P/(1-T)+\ldots+[P/(1-T)]^n)$$
$$=1/(1-T)\ (D^n + D^{n-1}[DP/(1-T)]+\ldots+[DP/(1-T)]^n) \quad (9)$$

It will be noted in the above equation that the remainder term has been dropped to provide the approximation, as with the derivation of $G_n$ previously. In Equation 9 above, 1/(1−I) is realizable in recursive form and DP is realizable in non-recursive form. What has been done up to this point is that in formulas 4 and 9, two equalizer response functions, $G_n$ and $\hat{G}_n$, respectively, have been derived. These formulas representing the desired equalizer responses will be shown to be susceptible of realization in hardware in the subsequent description.

First, however, there will follow a brief comparison of the equalization errors which occur with both the $\hat{G}_n$ and $G_n$ forms. It may be shown that the upper bound or maximum distortion utilizing the $G_n$ form is denoted by $$\hat{\epsilon}_n = (x+y)^{n+1} = (1-\epsilon)^{n+1} \quad (10)$$

The upper bound or maximum distortion utilizing the $G_n$ form of the equalizer is denoted by:

$$\epsilon_n = [y/(1-x)]^{n+1} = [(1-x-\epsilon)/(1-x)]^{n+1} = [1-\epsilon/(1-x)]^{n+1} \quad (11)$$

It will be noted that in the above two formulas the following apply.

Let $||T||=x$, $||P||=Y$
and $||F||=x+y=1-\epsilon$, where $0<\epsilon<1$.

Comparing or setting a ratio between the respective maximum distortions from formulas 10 and 11, the following equality is obtained:

$$\epsilon_n/\hat{\epsilon}_n = ([(1-\epsilon)\ (1-x)]/y)^{n+1} = (1+(x/y)\epsilon)^{n+1} \quad (12)$$

From the above formula when $x > 0$, the $\epsilon_n$ is larger than $\hat{\epsilon}_n$. When $y=0$ (i.e., there is no precursor interference term), $\hat{\epsilon}_n=0$ for any non-negative $n$ while $\epsilon_n$ remains positive. It is thus apparent from the above comparison that the distortion for $\hat{G}_n$ is less than that for $G_n$. However, as will be apparent from the subsequent description of the embodiments, the hardware realization of $\hat{G}_n$ is a bit more cumbersome.

Having generally discussed and described the mathematical derivation and meaning of formulas 4 and 9 for the $G_n$ and $\hat{G}_n$ forms of the equalization, what must now be considered is the realization of these two mathematical approximations in hardware. As stated previously, it is possible to realize these forms in hardware which require no computations to be performed to adjust the equalizer tap weights once the precursor P and tail T of the normalized channel response, $H=1-T-P$ have been accurately estimated by means of some sort of well known summing or averaging circuitry. Considering the forms of Equations 4 and 9, respectively, indicates that the problem of realizing these response functions centers on the realization of the form:

$$U_n = D^n = D^{n-1}\ V+\ldots+DV^{n-1}+V^n \quad (13)$$

In the above formula $D$ represents pure delay (i.e., a positive integral power of $z^{-1}$) and $V$ is any realizable time domain filter response.

In the above formula let us define $U_n = 1$. Referring to Equation 13, it is clear that:

$$U_n = U_{n-1}V + D^n,\ n = 1, 2, 3,\ldots$$

and $U_n = U_{n-1}D + V^n$. Thus, we have an iterative realization for $U_n$ as indicated by:

$$U_n = (\ldots[((V+D)\ V+D^2)\ V+D^3]\ v+\ldots+D^{n-1})V+D^n \quad (14)$$

Also, since D and V appear symmetrically in formula 13, there is an alternative iterated form:

$$U_n = (\ldots[((D+V)\ D+V^2)\ D+V^3]\ D+\ldots+V^{n-1})\ D+V^n \quad (15)$$

In the above formula it will be noted that D and V have been interchanged from the form of formula 14.

Proceeding now to a discussion in the way in which the above disclosed relationships specifically as set forth in formulas 4, 9, 14 and 15 may be realized to produce an essentially iterated equalizer, it should be clearly understood that the above equalization operations may be carried out in either the analog or digital mode. Generally the present description relates to an analog type of embodiment. However, a digital equivalent will be clearly discussed in the ensuing description.

The embodiment of $G_n$, from Equation 4 will require the embodiments of the operators D and DF. D is a pure delay of the received signal. $M\tau$ denotes M units of time. It may be embodied in analog form by means of an analog linear delay line. If the received signal has been digitized (i.e., quantized in amplitude and binary coded), then D can be embodied by means of a parallel set of binary shift registers; one shift register corresponding to each binary digit in the coded amplitudes. The shifting sequence would obviously have to be synchronized with the received data rate.

$$DF = -\sum_{k=1}^{M} h_k z^{k-M} - \sum_{k=1}^{N} h_{-k} z^{-k-M} \quad (16)$$

is embodied in analog form by means of a tapped delay line with multiplicative weights (i.e., amplifiers or attenuators at the taps and a summation of the tap outputs). In other words, this is a transversal filter and the digital equivalent of the delay sections ($\tau$ seconds between taps) would be shift register sections and the tap amplifiers would be replaced by binary multipliers. The digital embodiments can, of course, be quite varied in detail, borrowing from digital computer techniques. Multiplications, for instance, may be carried out by one or more time shared multipliers. Furthermore, if a real-time system were available, a good deal of the present hardware functions could be carried out by a suitable program.

Figure 1B:
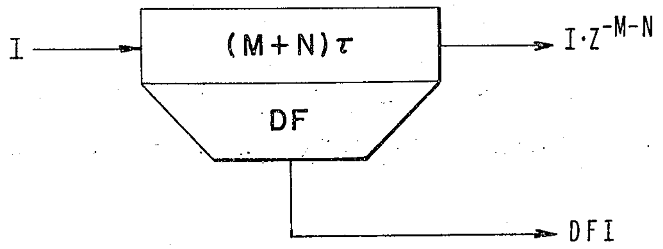
FIG. 1B comprises a simplified diagrammatic representation of a filter having the response of FIG. 1A. as used subsequently in the drawings.

FIG. 1A shows a schematic diagram of a functional component for performing or accomplishing the function DF, FIG. 1B shows a functional block diagram of the circuitry of FIG. 1A, which will be used hereafter for all non-recursive time domain filter sections or modules performing the function DF. Referring to FIG. 1A it will be noticed that the input is a signal sequence I, the output is the modified or transformed sequence DFI. It will also be noted that various taps $C_k$ are controlled by the Tap Control registers which have been generally described previously and which control the actual tap settings as a result of the determination of the received signal response as will be set forth more specifically with respect to FIGS. 6 and 7.

Figure 4A:
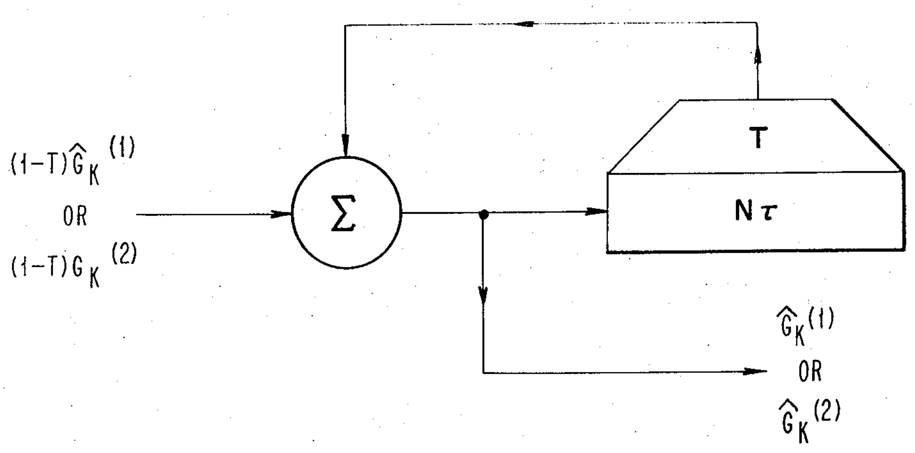
FIG. 4A is a diagrammatic representation of an equalizing module used with the modules of FIG. 4B and FIG. 5.

Looking at FIG. 1B, it will be noted that the upper section of the block labeled (M + N) $\tau$ means that the filter contains a total delay of M + N units of time. It will be noted, of course, that there is one additional tap; i.e., M + N + 1, but that there are only M + N delay stages.

$$T = -\sum_{k=1}^{N} h_{-k} z^{-k} \quad (17)$$

has a response which begins no sooner than $\tau$ seconds later than its input. Therefore, it is possible to realize the transform 1/(1−T) in recursive form. A functional embodiment of this particular form is shown in FIG. 4A wherein the inputs and outputs are appropriately labeled to indicate the preceding relationships. This particular module is utilized, as will be seen subsequently, in the embodiment of the equalizer function $\hat{G}_n$.

Figure 1C:
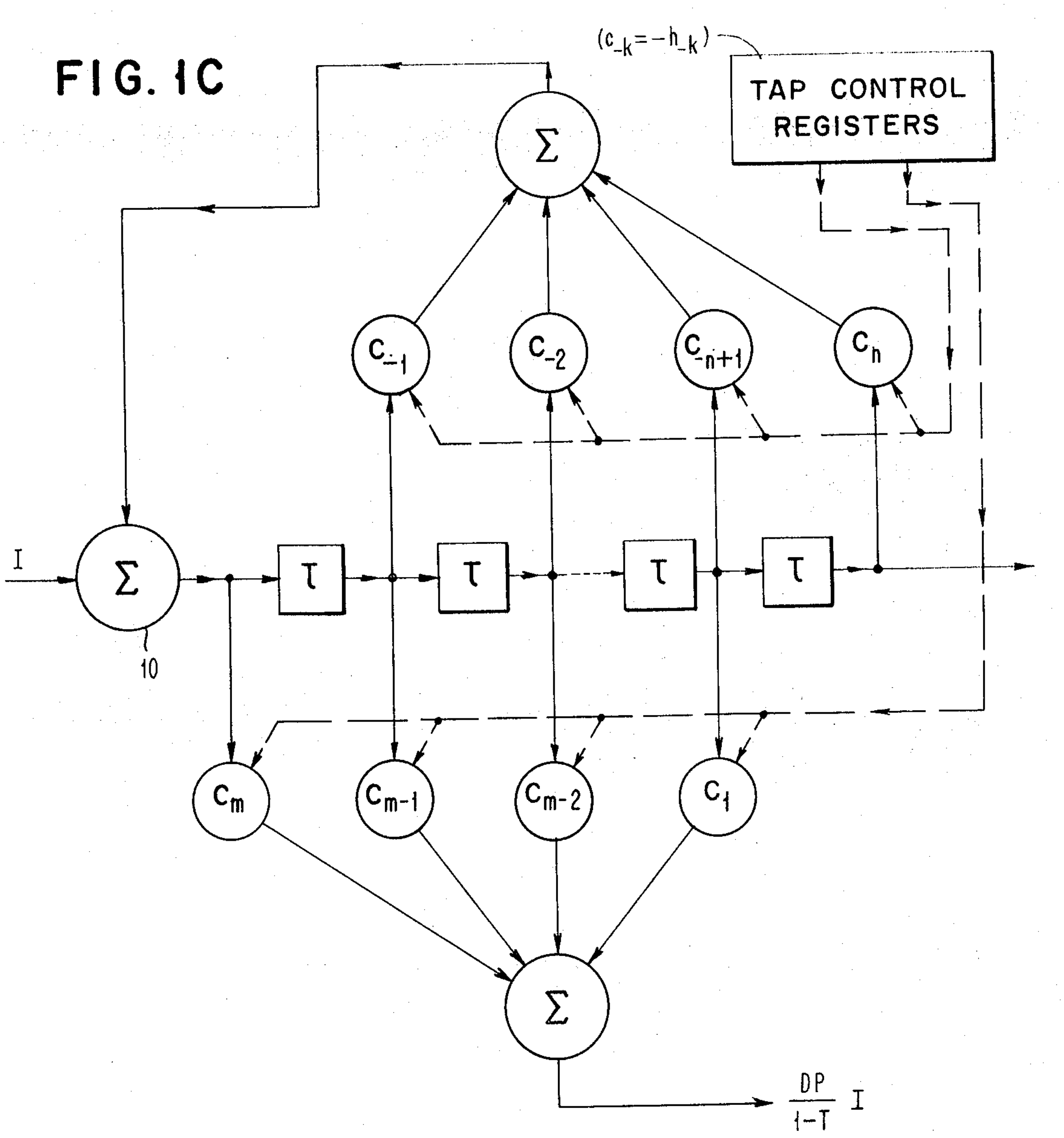
FIG. 1C comprises a schematic representation of a time domain transversal filter labeled to realize a response DP/1−T.
Figure 1D:
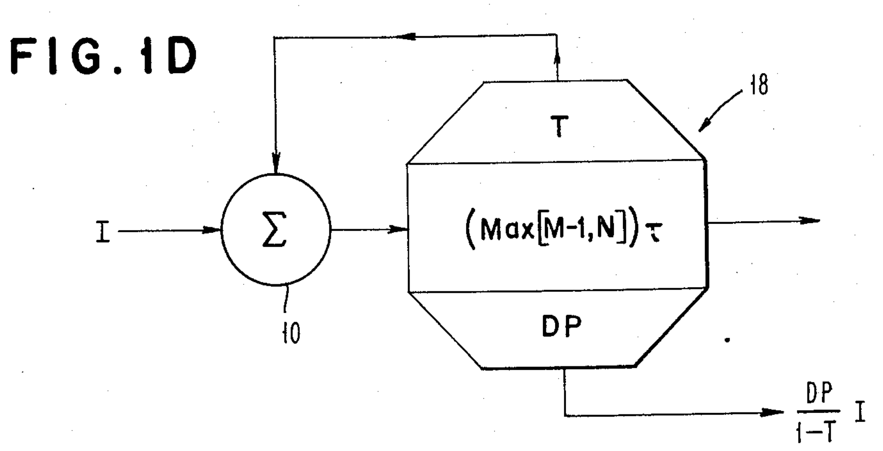
FIG. 1D comprises a simplified diagrammatic representation of a filter having the response of FIG. 1C as used subsequently in the drawings.

Referring to FIGS. 1C and 1D, the product of two realizable operators could be embodied in the tandem or serial connection of their separate embodiments. Thus, in order to obtain the function DP/(1−T), it would be possible to first obtain 1/(1−T) and utilize that as an input to a block for obtaining DP, or alternatively, the embodiment as shown in detailed form in FIG. 1C and in functional block form in FIG. 1D could be employed. In this case a shortened delay line is utilized having two sets of taps, one for the precursor terms and the other for tail terms. By taking the output from the summation of the tail terms and feeding these back into the adder 10, the function 1/(1−T) is obtained and then feeding this again into the delay stages and taking the lower output, the overall function DP/(1−T) is obtained. This basic functional unit or module is also applied in the realization of the equalizer function $\hat{G}_n$.

Figure 2:
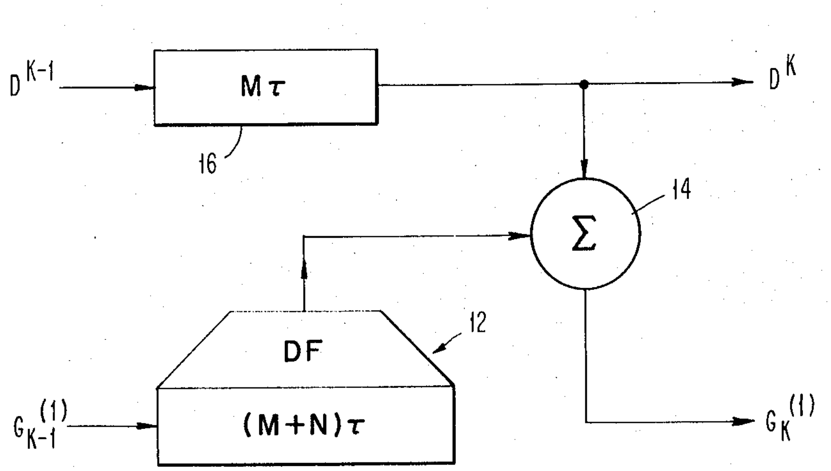
FIG. 2 is a schematic representation of an equalizing module constructed according to a first embodiment of the present invention.
Figure 3:
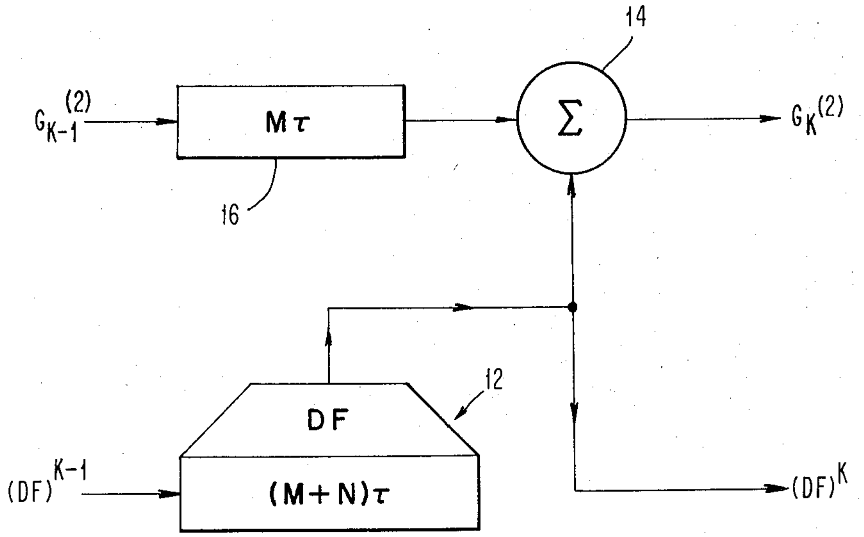
FIG. 3 is a diagrammatic representation of an equalizaing module constructed in accordance with the second embodiment of the present invention.

The invention will now be set forth with respect to the preferred embodiments of the invention as shown in the modules of FIGS. 2, 3, 4 (A and B) and 5. It should be understood that the control circuits shown in the FIGS. 6 and 7 control the operation of the resulting equalizers in the automatic and adaptive modes, respectively.

Referring first to the embodiments of the function $G_n$ as originally developed in formula 4, FIGS. 2 and 3 disclose iterative modules for accomplishing the desired equalizer filter response. To understand how these designs were obtained, reference should be made to the preceding Equations 4, 13, 14 and 15. By making appropriate substitutions in these equations, it is possible to obtain two iterated forms of the desired filter response $G_n$. These are $$G_n^{(1)} = ( \ldots (([DF]+D)[DF]+D^2)[DF] + \ldots + D^{n-1})[DF]+D^n \quad (18)$$

$$G_n^{(2)} = ( \ldots ((D+[DF])D+[DF]^2)D + \ldots +[DF]^{n-1})D+[DF]^n \quad (19)$$

In order to realize the function of either formulas 18 or 19, a plurality of the modules shown in FIG. 2 or FIG. 3, respectively, would merely be hooked up in tandem. The total number of modules utilized determines the number n in the formulas, it being obvious that $n$ must be a positive integer. In these embodiments it will be noted each module has two inputs and two outputs. The input signal is applied to both inputs of the first module and the desired, equalized output signal sequence would be $G_n$ times the input. If the present equalization system were to be utilized in an adaptive scheme, it might be necessary also to obtain the received signal altered only by a delay of $D^n$ where D represents M total delay units where $n$ equals the number of modules. Thus, in an adaptive scheme it would be preferable to use the form illustrated in FIG. 2.

Figure 4B:
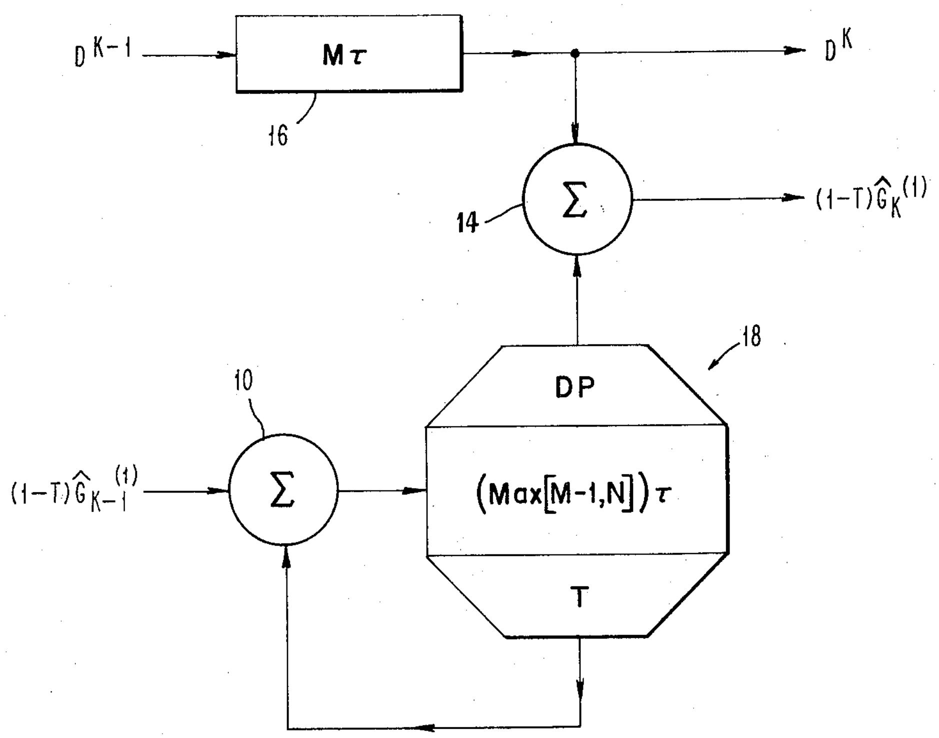
FIG. 4B is a diagrammatic representation of an equalizing module constructed in accordance with a third embodiment of the present invention.
Figure 5:
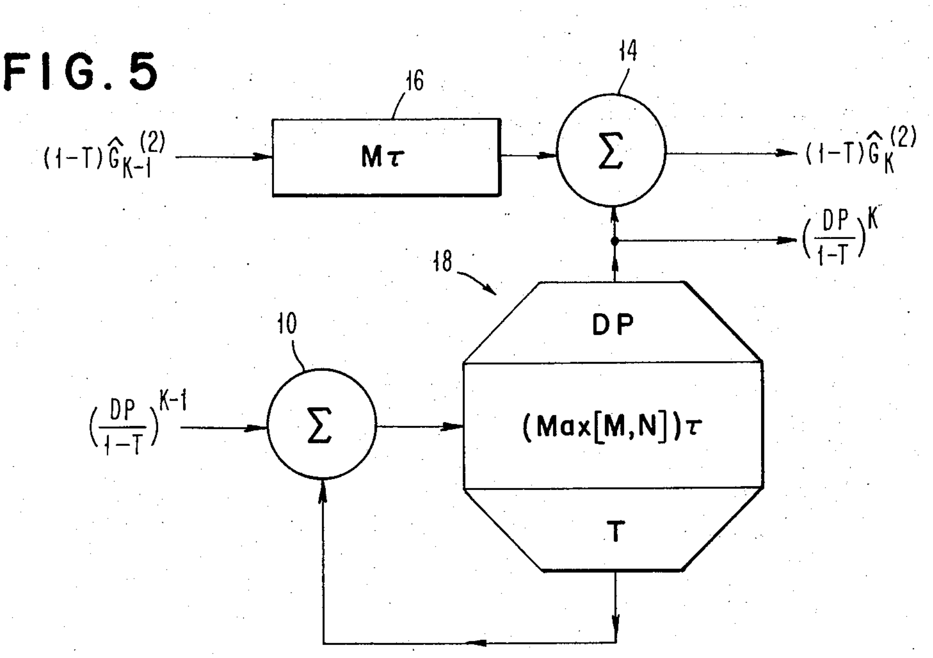
FIG. 5 is a diagrammatic representation of an equalizing module constructed in accordance with a fourth embodiment of the present invention.

Relative to both the embodiments of FIGS. 2 and 3 and also FIGS. 4B and 5, the number of modules n determines the degree of the equalization polynomial applied to equalize the input signal. As will be apparent, as the degree of a given term is greater, its equalization effect is less. However, the more modules, the more accurate the equalization. It has been found that approximately four modules of the type of FIG. 2 or FIG. 3 will give satisfactory equalization and that two or three of the modules in FIGS. 4B or 5 would be utilized with a single module of the type shown in FIG. 4A to give satisfactory equalization.

Returning again to FIGS. 2 and 3, it will be noted that the equalizer filter shown functionally as 12 performs the function [DF]. The summers or adders 14 perform the addition function indicated in the formulas. Referring to FIG. 2, specifically considering the innermost parenthetical term [DF] + D, of equation 18, this function would be performed by the first module in a tandem arrangement of the modules, wherein the input sequence is applied to both inputs of the first module. The equalizer filter 12 performs the operation DF and the delay segment 16 provides the output D. These are combined in the adder 1 to produce the function $G_k$ for that particular module. Consider now the next set of parentheses. The previous output $G_1$ is utilized as the input to module 2. The equalizer filter 12 in module 2 performs to DF transform on its input. The previously described delayed output signal D is delayed another D units to produce an output $D^2$, both of which are fed to the adder 14 to produce an output $G_2$. This operation continues in tandem depending on how many modules are utilized. If four modules were to be utilized, the formula of FIG. 2 would have $n = 4$.

The exact same organization applies to the realization of $G_n$ as shown in formula 19 and illustrated in FIG. 3. The operation [A] interconnection of the modules is exactly the same as in FIG. 2, it being specifically noted that in this case it is the output $G_k$ which passes through the simple delay operation of the block 16 whereas the output (DF) is fed directly into the successive filter block 12.

The function of the embodiments of FIGS. 2 and 3 is substantially equal, the only difference, as stated previously, being that the original signal delayed in time would be available in the output of the embodiment of FIG. 2 whereas it would not be available in the embodiment of FIG. 3. Thus, the embodiment of FIG. 2 might be preferable for a system operating in the adaptive mode.

Figure 6:
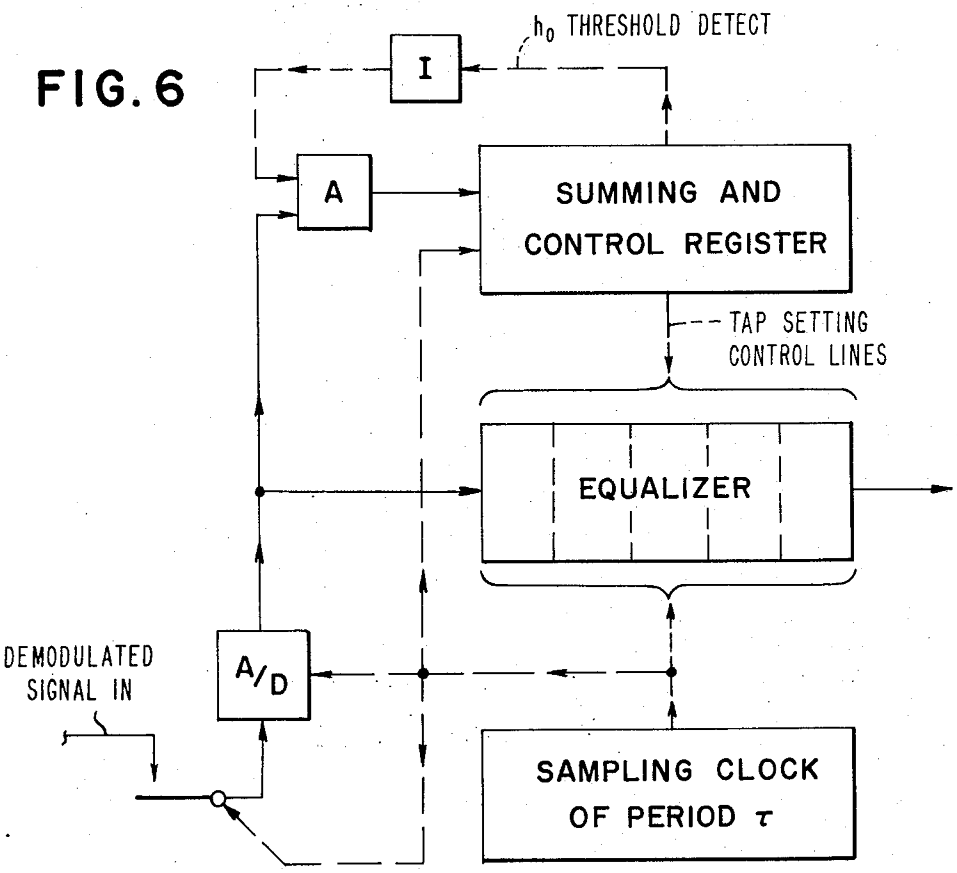
FIG. 6 comprises a functional block diagram of a system for averaging and normalizing a received training sequence to produce the equalizer tap gain control signals when operating in the automatic mode.
Figure 7:
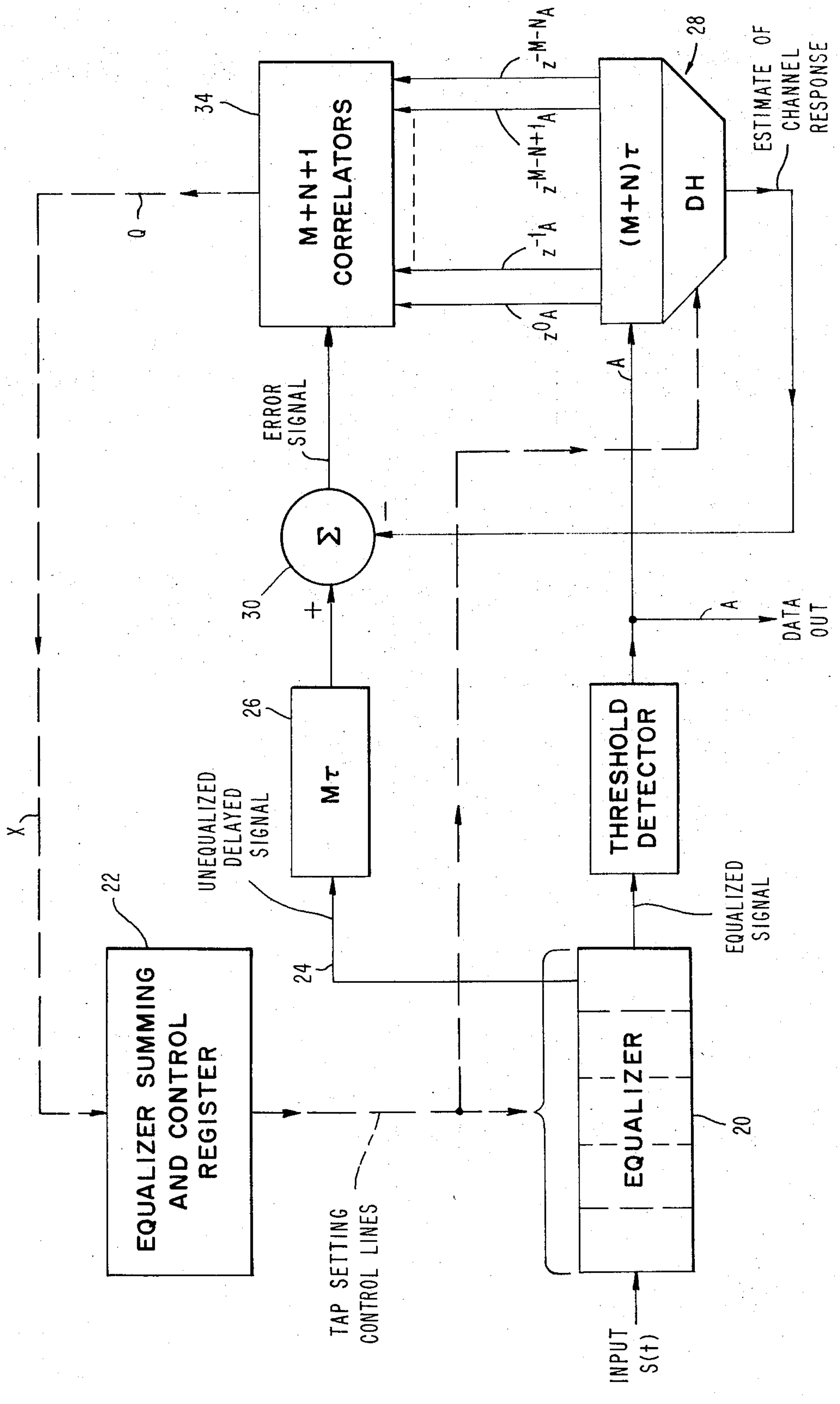
FIG. 7 comprises a functional block diagram of a system for deriving tap gain control systems when the system is operating in the adpative mode.

Before proceeding with the operation of the control circuitry for the automatic and adaptive modes as shown in FIG. 6 and FIG. 7, the overall equalizer structures of FIGS. 4A and 4B and FIG. 5 will be set forth, as the actual controls are the same in all embodiments, only the structure of the particular equalizer circuits themselves being somewhat different depending upon the particular module structures being utilized.

As with the embodiments of FIGS. 2 and 3, formulas 9 and 13, 14 and 15 show that two different iterated forms of the function $G_n$ are obtainable. These algebraic forms are as shown below.

$$\hat{G}_n^{(1)}=\frac{1}{1-T}\left\{\left(\cdots\left(\left(\left[\frac{DP}{1-T}\right]+D\right)\left[\frac{DP}{1-T}\right]+D^2\right)\left[\frac{DP}{1-T}\right]+\cdots+D^{n-1}\right)\left[\frac{DP}{1-T}\right]+D^n\right\} \quad (20)$$

$$\hat{G}_n^{(2)}=\frac{1}{1-T}\left\{\left(\cdots\left(\left(D+\left[\frac{DP}{1-T}\right]\right)D+\left[\frac{DP}{1-T}\right]^2\right)D+\cdots+\left[\frac{DP}{1-T}\right]^{n-1}\right)D+\left[\frac{DP}{1-T}\right]^n\right\} \quad (21)$$

It will be noted that in both of these forms the term DP/(1−T) recurs together with the simple delay operator D. It will be further noted that an additional operator 1/(1−T) also appears outside of the braces in both forms. This function may be obtained by the functional block of FIG. 4A which was generally described previously. As will be apparent, this block could be utilized either at the beginning or at the end of the other modules as shown in FIGS. 4B and 5. In the embodiment and legends shown in FIGS. 4A, 4B and 5, it is assumed that the function 1/(1−T) is embodied as the last of the tandem equalizer modules rather than the first. Thus, the simple delayed input $D^n$ is available at the output of the system assuming that the form of equalizer shown in FIG. 4B is utilized. The operation of the overall equalizer systems of FIGS. 4B and 5 is substantially the same as in FIGS. 2 and 3. In all cases the block 16 represents an M unit delay wherein each unit is $\tau$ seconds. Similarly, the final adder stage 14 performs the summation operation required in the formulas 20 and 21. It will further be noted that the function DP/(1−T) is realized in the circuitry including the adder 10 and the tandem equalizer filter 18. This block was previously described with reference to FIG. 1D. In both of these embodiments, as in FIGS. 2 and 3, the contents of a particular pair of parentheses represents the output $G_k$ of a particular module $k$ of the overall equalizer. It being noted that in the FIGS. $G_k$ is preceded by the term (1−T). If the module of FIG 4A precedes the modules of FIGS. 4B and 5, this term would not be present. In essence, the module of FIG. 4A performs the function 1/(1−T) such that the (1−T) term is canceled and made unity. As with the embodiments of FIGS. 2 and 3 a plurality of the modules of FIGS. 4B or 5 would normally be utilized to obtain a satisfactory level of equalization. As stated before, in practice, two or three of the more complex modules of FIGS. 4B and 5 would be utilized, together with one of the modules of FIG. 4A wherein the latter is normally connected to the end of the equalizer.

It should be clearly understood that in all of the equalizer embodiments of FIGS. 2, 3, 4B and 5, the actual equalizer taps within the individual equalizer filters; i.e., 12 of FIGS. 2 and 3 and 18 of FIGS. 4B and 5 are controlled by a single set of tap gain control registers. Thus, tap $C_{-1}$ in all filters would always receive the same signal and similarly tap $C_4$, etc. in all filters would receive the same tap setting. It should also be noted that the final output of all four embodiments is that labeled $G_k$ or $G_k$ wherein it is assumed that the module of FIG. 4A appears at the end of the FIG. 4B and FIG. 5 filters.

Having thus shown four preferred embodiments of the actual equalizer modules, the control circuits of FIGS. 6 and 7 are exemplary of two ways in which the proper tap control settings for the equalizer filters are obtained in the automatic and adaptive modes, respectively.

All of the embodiments described are constructed out of time-domain filter sections having the responses T, P, or F where $F = T + P$. The construction employs tandem connection, delay, summation and recursive summation. All of the necessary adjustable tap weights, however, are to be found as the simple coefficients of F, obtained by estimating the amplitude of interference at the various signal sampling points.

This means that the equalizer is ready for automatic mode operation when the coefficients of F have been stored in an appropriate control register. Nevertheless, it is necessary to recall that −F is the normalized interference of the transmission system; that is, the value of the main pulse of the received signal H must be unity.

Supposing that the system has adequate gain control to achieve this, then, during the equalizer "training" a train of sufficiently separated pulses is transmitted, which will cause reception of the basic pulse as well as precursor and tail intersymbol interference terms. These are sampled at the receiver, and the sample values are stored and averaged. The averaging is simply a means for improving the signal-to-noise ratio in the stored estimate of F. When this has been done, the equalizer is ready to receive data. One simple way to perform the "averaging normalization" is as follows.

Let it be predetermined that some reasonable number K of pulses must be transmitted and the various sample values including the central sample $h_0$ must be separately summed over the K pulses in the control register. When the value:

$$\sum_{i=1}^{K} h_0(i)$$

is sufficiently close to unity, the summation process is terminated. Stated differently, assume that the received values of $h_0$ are, for example, 0.05 in any arbitrary units. Then, 20 sample pulses would have to be received to produce a unity value. For example, if $h_0$ is approximately 1/20th of unity as suggested above, it is possible to normalize within plus or minus 2.5 per cent by this means.

Referring to FIG. 6, a system as described above is utilized. The sampling clock of period $\tau$ is appropriately synchronized with the transmitting data source so that the sampling period will at least approximately coincide with the arrival of the maximum peak of the received data pulse. It is obviously necessary that each subsequent signal set be received with the proper timing so that the various components are properly added to the proper storage position of the control register. The analog to digital converter box (A/D) would be utilized in a digital system wherein each sample of the analog received signal is converted to a set of binary digits. The line marked "$h_0$ threshold detect" indicates when the fundamental component $h_0$ has reached a predetermined threshold value near the unity level and that therefore, all of the other component terms are properly scaled thereto for routing to the equalizer tap controls. At this point, a signal is utilized to disable the AND circuit at the input to the summing and control registers via an inhibit box (I) as shown. Once this point is reached, the equalizer circuits will be able to then pass actual data signals. As stated previously, this particular embodiment is especially suited for the automatic mode of operation wherein appropriate training sequences are available to precede the actual transmission of data. It should be noted in the figure that the equalizer circuit is indicated as having an n modules and that the block is partioned with dotted lines. This implies that there are a plurality; i.e., n separate equalizer modules as described in detail previously and that the same control register lines go to each equalizer module. This same configuration is utilized in the adaptive mode control system of FIG. 7.

In the event that the channel response as shown in Equation 1 is likely to change during the transmission period, then it is desirable to periodically re-estimate the response and readjust the equalizer accordingly. This could be done with the automatic equalizer of FIG. 6 by periodically interrupting the data transmission for a new training sequence whereby it would be possible to reflect any changes in the transmission line response by storing different tap signals in the tap control registers.

Adaptive equalizers, however, can be readjusted without the interruption of data transmission. In a typical prior art adaptive equalizer such as disclosed in the article "Techniques for Adaptive Equalization of Digital Communication" of R. W. Lucky, *Bell Systems Technical Journal*, Vol. 45, February 1966, there is used statistical, "maximum likelihood" estimates of the response of the channel and equalizer in tandem. The equalizers disclosed herein, however, are adjusted according to the channel response alone. Therefore, the maximum likelihood estimation is proposed herein relative to the received signal rather than to the equalized signal.

FIG. 7 discloses a control system for finding a corrective increment to the estimated channel response.

Mathematical derivations of the operation of the adaptive system of FIG. 7 are available; however, it is not believed that they would materially aid in the understanding of the present invention. Accordingly, the following is a general description of the operation of the adaptive system of FIG. 7 wherein, reference numerals will be utilized to refer to the various functional blocks thereof.

Referring epecifically to FIG. 7, block 20 marked "equalizer" is shown divided into a plurality of partitions and again relates to a plurality of modules of the equalizer circuits set forth previously with respect to FIGS. 2–5. Block 22 indicated as the "equalizer summing and control register" performs the same function as the similarly marked block in FIG. 6 or to provide the specific tap control settings to the various modules of equalizer 20. It will be noticed that there is an output line indicated as 24 which has the unequalized delayed input signal thereon. Line 24 is connected to a delay unit 26 marked $M\tau$ which is to synchronize the output thereof with the output of a further filter shown as 28. The output of this filter is subtracted from the output of the delay unit 26 in the adder 30. The output of the adder 30 will obviously reflect the difference between the two inputs thereto. What is done in the present embodiment is that when the system starts up, the control registers would be set to some arbritrary designation such as C = 0 for any tap $C_k$ other than the tap $C_0$ in the equalizer. That would be set equal to 1. Then beginning with this initial setting, a stream of actual data would be received by the system and passed through the present circuitry, it being noted that the output of the adder 30 passes into a set of M + N + 1 correlators or a correlator for each tap of the time domain filter 28. It will be noted that there are a similar number of inputs to the correlators 34 which represent direct connected delayed data outputs from the delay line portion of the filter 28. The signal appearing on these lines $z^0A$ to $z^{-M-N}A$ are multiplied by the output of the adder 30 in the correlator and the resulting sums ultimately are utilized to modify the tap weighting signals stored in the control register 22. Thus, in the embodiment of FIG. 7, the tap setting controls in the register 22 are periodically updated by the output of the correlator block 34. Each time the register 22 is updated the correlators are reset to zero and a new period of correlation is begun.

The above description of the operation of the adaptive mode controls for the present system completes the description of the present invention, it being specifically understood that in the adaptive as well as the automatic mode essentially a single set of control registers for providing a single set of tap weights is utilized both the automatic and adaptive mode control systems. Further, regardless of the mode control utilized, the actual equalizer configuration would be the same whether it be that of FIGS. 2, 3, 4B or 5.

In addition to the arrangement specifically set forth and described previously, it is possible additionally to develop a highly iterative factored form of filter utilizing the general concepts of the invention, wherein the basic modules are identical but wherein one tap setting of each subsequent module is set to a unique predetermined value. Stated differently, in the previously disclosed systems each module had its individual filter taps set identically from the control register whereas in the forms suggested herein the same would hold true for all taps but one in each module. As stated previously, a number of different iterative configurations of an equalizer filter again approximating the desired inverse of the channel response is realizable. The primary and significant features of the present invention are that the actual tap control settings are determined from the channel response directly rather than from the equalizer output. Therefore there is no necessity to provide repeated corrections to the tap weights when operating in the automatic mode. Further, there are only as many tap weights stored as there are significant interference terms, thereby greatly reducing the total number of actual storage register locations, compared with more conventional equalizing filters wherein normally two to three times as many distinct tap weights are utilized in the equalizer.

It has been found that the equalizer filter configurations of the presently disclosed invention provide the fastest possible adequate equalization at minimal cost for a number of different operational requirements. The modularization of the basic equalizer modules themselves allows for the ready incorporation of integrated circuit techniques into their construction. Further, it is relatively easy to improve the degree of equalization by merely adding on several additional equalizer modules without changing substantially any of the rest of the system.

What is claimed is:

1. An equalizer for a transmission channel of limited bandwidth comprising:

means for sampling the output of said channel;

means for estimating and storing the sampled and normalized interference terms arising from the transmission of a data signal through said channel;

modular means for equalizing the output of said channel wherein at least one module is connected in tandem to accomplish said equalization, each module including at least one delay element and time-domain filter; and means associated with said time-domain filters for determining the output tap gains of said time domain filter directly from said estimate of said normalized interference terms.

2. A method for equalizing an electrical signal sequence received from a channel, said sequence being represented by the function 1−F where −F represents intersymbol interference terms caused by channel response characteristics, said method comprising the steps of:

performing a series of iterative equalization operations on the received signal sequence, each operation being representable by a transfer function, said functions being derived by setting the desired equalizer function G equal to D/(1−F), wherein D is a delay, and selecting an iterative form of a polynomial expansion thereof with remainder terms truncated;

each of said series of equalization operations including passing the received signal sequence through an equalizer module wherein each module performs one of the iterative terms of said desired function G.

3. A method as set forth in claim 2 which includes the step of deriving tap settings for all of the adjustable tap means of an equalizer filter in each module by estimating the amplitudes of the intersymbol interference terms present in the as received signal from the channel and normalizing said amplitudes with respect to the main data pulse $h_0$ and supplying these derived tap settings to the same respective tap of each equalizer filter in each module.

4. A method as set forth in claim 3 which includes passing said received signal sequence through as many iterative equalization modules as required by the particular form of the polynomial expansion of the equalizer transfer function to obtain satisfactory equalization for a particular application.

5. Apparatus for eqaulizing an electrical signal sequence received from a channel, said sequence being represented by the function 1−F wherein −F represents intersymbol interference terms in the as received signal due to the channel response characteristics, said apparatus comprising:

a plurality of equalizing modules connected in tandem to the input of said channel, each module comprising an equalizer filter having at least as many taps as intersymbol interference terms to be equalized, means for deriving tap control settings for each tap directly from the as received signal from the channel;

storage means for storing said desired tap control settings and supplying identical tap control signals to all modules;

logic circuit means in each module whereby the module performs a transfer function derived from the polynomial expansion of the desired equalizer function rounded off to remove remainder terms.

6. An equalization apparatus as set forth in claim 5 including means for operating said equalizer in the automatic mode including means for deriving the tap settings as the actual negatives of amplitudes of the respective intersymbol interference terms normalized with respect to the main data pulse $h_0$ and means for applying the respective settings to the proper taps of the equalizer filters.

7. An equalization apparatus as set forth in claim 5 including means for operating said equalizer in the adaptive mode including further equalizer filter means in said adaptive control means wherein the received signal from the channel is compared with an estimate of said received signal to derive an error signal, and means for correlating said error signal with detected data magnitudes and for producing a corrective signal to the stored gain control settings.

8. An equalization apparatus as set forth in claim 5 wherein the iterative polynomial expansion performed by n modules takes the from $$G_n^{(1)} = ( \ldots ([DF] + D)\ [DF] + D^2\ \ [DF] + \ldots + D^{n-1}, \ [DF] + D^n$$

wherein $DF$ is performed by a non-recursive time domain equalizer filter and $D$ is performed by a delay of the signal sequence entering the module, and wherein in each module the signal represented as contained within each right parenthesis is the input to said filter.

9. An equalization apparatus as set forth in claim 5 wherein the polynomial expansion of the desired equalizer response is of the form $$G_n^{(2)} = ( \ldots \ (D+[DF])\ D+[DF]^2 \ \ D + \ldots + [DF]^{n-1})\ D+[DF]^n$$

wherein $DF$ is performed by a non-recursive time domain equalizer filter and $D$ is performed by a delay of the signal sequence entering the module;

and wherein each module the signal represented as contained within each right parenthesis is the input to the delay circuit.

10. An equalization apparatus as set forth in Claim 5 wherein the polynomial expansion of the deisred equalizer response is of the form $$\hat{G}_n^{(1)} = \frac{1}{1-T}\left\{\left( \cdots \left(\left(\left[\frac{DP}{1-T}\right]+D\right)\left[\frac{DP}{1-T}\right] + D^2\right)\left[\frac{DP}{1-T}\right] + \cdots + D^{n-1}\right)\frac{DP}{1-T} + D^n\right\}$$

where $[DP/(1-T)\ ]$ is performed by a recursive time domain filter in each module, and where $D$ is performed by a delay of the signal sequence entering the module;

and wherein in each module the signal represented as contained within each right parenthesis is the input to said filter.

11. An equalization apparatus as set forth in claim 5 wherein the polynomial expansion of the desired equalizer response is of the form $$\hat{G}_n^{(2)} = \frac{1}{1-T}\left\{\left( \cdots \left(\left(D+\left[\frac{DP}{1+T}\right]\right)D + \left[\frac{DP}{1-T}\right]^2\right)D + \cdots + \left[\frac{DP}{1-T}\right]^{n-1}\right)D + \frac{DP}{1-T}^{n}\right\}$$

where $[DP/(1-T)]$ is performed by a recursive time domain filter in each module, and where $D$ is performed by a delay of the signal sequence entering the module; and wherein in each module the signal represented as contained within each right parenthesis is the input to the delay circuit.

* * * * *

PO-1050
(5/69)

UNITED STATES PATENT OFFICE
CERTIFICATE OF CORRECTION

Patent No. 3,764,914 Dated October 9, 1973

Inventor(s) Maurice Karnaugh

It is certified that error appears in the above-identified patent and that said Letters Patent are hereby corrected as shown below:

Column 18, line 12, Change "$((D+[\frac{DP}{1+T}])D$" to -- $((D+[\frac{DP}{1-T}])D$ --;

Signed and sealed this 17th day of September 1974.

(SEAL)
Attest:

McCOY M. GIBSON JR.
Attesting Officer

C. MARSHALL DANN
Commissioner of Patents